Patented Aug. 9, 1938

2,126,232

UNITED STATES PATENT OFFICE 2,126,232

DIARYL METHANE WATER-SOLUBLE CONDENSATION PRODUCTS

Arthur Voss, Frankfort-on-the-Main-Hochst, and Heinrich Janz, Bad Soden in Taunus, Germany, assignors to I. G. Farbenindustrie Aktiengesellschaft, Frankfort-on-the-Main, Germany No Drawing. Application February 9, 1937, Serial No. 124,920. In Germany February 21, 1936

4 Claims. (Cl. 260—505)

The present invention relates to water-soluble condensation products.

We have found that water-soluble condensation products are obtained by condensing aromatic hydrocarbons or the derivatives thereof containing more than one halogen methyl group with aromatic hydrocarbons or the derivatives thereof and rendering the condensation products obtained soluble in water by the introduction of sulfonic acid groups before, during or after the condensation.

The new products have the formula:

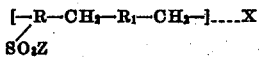

wherein

R and R₁ stand for aromatic residues substituted or not and Z stands for hydrogen or an alkali metal.

X means that the products may be not only mono-molecular but that the parent substances may be combined in the manner of a chain by a repeated reaction.

The bodies may be prepared by causing the aromatic hydrocarbon derivative of methyl chloride or a derivative thereof to act upon an aromatic hydrocarbon or a derivative thereof in the presence of sulfuric acid or another condensing agent and then sulfonating the condensation product obtained.

The new bodies are also obtained by causing the two components to act upon each other in the presence of a sulfonating agent, i. e. by condensing as well as sulfonating in one operation.

It is also possible first to sulfonate the one component and then to cause the methyl chloride derivative to react on the sulfonation melt, if required with the further addition of sulfonating agents.

As aromatic sulfonic acid component there may be used naphthalene, but other aromatic and hydroaromatic hydrocarbons and the derivatives thereof, such as phenol, xylene, aniline and others are suitable. It is advantageous to start with a fundamental substance of a high molecular weight, i. e. substances comprising several nuclei, such as napththalene, ethylnaphthalene, tetrahydronaphthalene, phenanthrene, anthracene.

In each of the foregoing processes there are obtained products which are readily soluble in water and brought to the acidity required for tanning purposes by the addition of a certain quantity of alkali. The products then constitute valuable tanning substances. Furthermore the new sulfonic acids may be used for various purposes in the textile industry, for instance as wetting agents, dispersing agents or other adjuvants in the dyeing industry.

The following examples serve to illustrate the invention, but they are not intended to limit it thereto, the parts being by weight:

(1) 120 parts of sulufuric acid monohydrate are run into 130 parts of naphthalene at a temperature of 70° C. to 80° C., while stirring. The temperature is then raised and kept at 140° C. until the naphthalene has been completely sulfonated. If required, a small quantity of sulfuric acid monohydrate may be added. The temperature is then decreased to 80° C. and at this temperature 110 parts of the reaction product of hydrochloric acid and formaldehyde on commercial xylene with at least two ω-chlormethyl- groups are slowly introduced by portions, while further stirring. The temperature increases by about 20° C.; if this is not the case, it is raised to about 100° C. and maintained there until a test of the fused material is soluble in water to a clear solution or one that is only very slightly turbid. The fused material is first diluted with water to twice its weight. Caustic soda solution is then added until about two thirds of the sulfonic acid have been neutralized. The clear, brownish, sirupy product obtained may be further diluted with water and then directly be used for tanning. There is obtained a light-colored and plump leather of an excellent tensile strength.

(2) 150 parts of di-(ω-chlormethyl)naphthalene as it may be obtained by the action of at least 2 molecules of formaldehyde in a hot, aqueous solution saturated with hydrochloric acid on 1 mol. of naphthalene are mixed with 100 parts of cresol (so-called tricresol) and the mixture is slowly heated. At about 100° C. the evolution of hydrogen chloride sets in. Pari passu with the decrease of this evolution the temperature is increased; finally the mass is kept gently boiling for a short time, until the evolution of hydrogen chloride has completely ceased. The mass which on cooling has solidified to a resin is comminuted and introduced by portions at 0° to 10° C. into 300 parts of chloro sulfonic acid. The progress of the sulfonation is ascertained now and then by tests. When a test is soluble in water to a clear solution the mass is diluted with twice its weight of water. The finished tanning agent is obtained by neutralization as described in Example 1. The leather produced with this tanning agent is soft and of a good touch. This tanning agent as well as that of Example 1 has still strong phlobophene-dissolving properties.

(3) 120 parts of solvent naphtha are introduced, at ordinary temperature, into 100 parts of concentrated sulfuric acid, while stirring; no sulfonation occurs. There are then slowly introduced into the mass 130 parts of a dried mixture of a naphthalene derivative containing methyl chloride groups; the naphthalene derivative is obtained by causing at least 2 molecules of formaldehyde in a hot aqueous solution saturated with hydrochloric acid to act upon 1 mol. of naphthalene. 20 parts of fuming sulfuric acid of 20 per cent. strength are then added and the whole is heated slowly to 100° C. When a test dissolves in water to a clear solution 500 parts of water are added as well as a quantity of caustic soda solution until a test shows a neutral reaction to litmus paper. The solution obtained is evaporated to dryness. A gray cake is obtained which may be pulverized, is soluble in water to a clear solution and constitutes excellent dispersing agents for dyeing purposes.

(4) 80 parts of a dichlormethylated toluene are introduced at 80° C. into 200 parts of a dibutylnaphthalene-sulfonic acid of 85 per cent. strength, while stirring. The temperature of the mixture is gradually raised until reaction sets in, the temperature is maintained until the reaction is complete and finally the temperature is raised to 120° C. After a short time the mass has become soluble in water; it is then diluted with 300 cc. of water, neutralized at 60° C. with caustic soda solution, filtered and evaporated. There is obtained a product soluble in water to a light colored solution and suitable as a wetting agent and emulsifying agent. When acidified it constitutes a valuable tanning agent.

(5) 160 parts of a mixture of alpha-chlornaphthalene and beta-chlornaphthalene obtained by the chlorination of naphthalene are transformed by the action of sulfuric acid monohydrate into a sulfonation product which consists for the most part of a monosulfonic acid. Into the crude melt there are slowly introduced at a temperature of 70° C. to 75° C., while well stirring, 65 parts of a phenol poly-chloromethylated by an abundant excess of formaldehyde and hydrochloric acid. The temperature is then slowly raised to 100° C. to 110° C. and kept there until a test is readily soluble in water. The mass obtained is diluted with 300 parts of water and neutralized with caustic soda solution; the neutralized solution is separated by filtration from small portions which have not been dissolved and the filtrate is evaporated. There is obtained a solid, light-gray powder which may be used for the peptization of water-insoluble bodies, such as acetate silk dyestuffs, or, after it has been brought to the required acidity, directly for tanning hides.

(6) 145 parts of tetrahydro-beta-naphthylamine are sulfonated so as to obtain monosulfonic acid. Into the sulfonated mass there are slowly introduced at 70° C. to 80° C., while stirring, 45 parts of a product obtainable by chlorinating xylene in the side chain until about 2 atomic proportions of halogens have been absorbed. The temperature is preferably kept for further 1-2 hours at about 100° C. until a test has become soluble in water. After the product has been sufficiently diluted and brought to the acidity required for tanning, it may directly be used for tanning. The leather obtained is more plump than that treated with a product obtained by the action of benzyl chloride on tetrahydronaphthalene-sulfonic acid.

We claim:

1. The condensation products of aromatic compounds containing more than one halogen-methyl group with aromatic compounds, said condensation products containing at least one sulfonic acid group and being in form of the free acids or their alkali metal salts water-soluble tanning agents, wetting agents and dispersing agents.

2. As new products the products of the following formula:

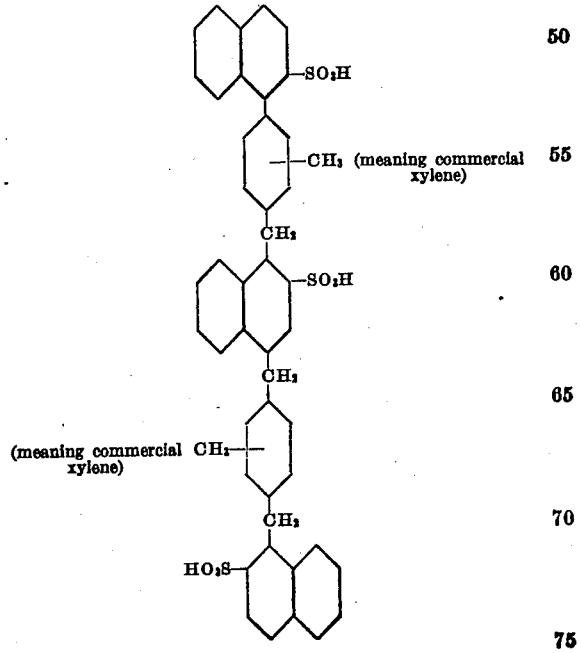

3. As new products, the products of the following formula:
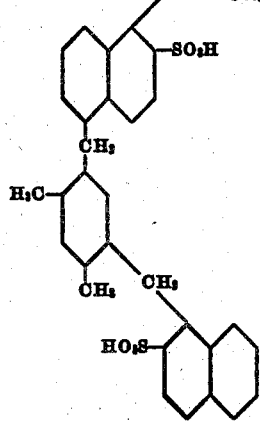
4. As new products, the products of the following formula:
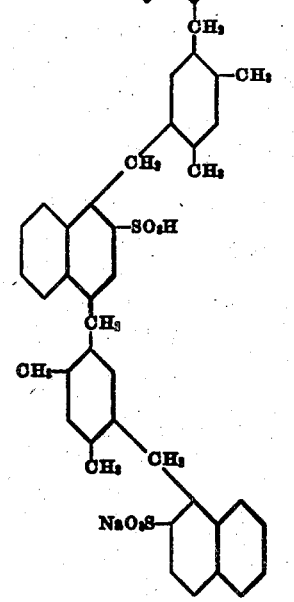
ARTHUR VOSS.
HEINRICH JANZ.